US012718742B2

(12) United States Patent
Tang et al.

(10) Patent No.: US 12,718,742 B2
(45) Date of Patent: Aug. 25, 2026

(54) MICRO LIGHT EMITTING DIODE DISPLAY

(71) Applicant: SCT LTD., Grand Cayman (KY)

(72) Inventors: Shang-Kuan Tang, Milpitas, CA (US); Shean-Yih Chiou, Milpitas, CA (US); Yi Zhang, Milpitas, CA (US); Eric Li, Milpitas, CA (US)

(73) Assignee: SCT LTD., Grand Cayman (KY)

( * ) Notice: Subject to any disclaimer, the term of this patent is extended or adjusted under 35 U.S.C. 154(b) by 0 days.

(21) Appl. No.: 18/950,305

(22) Filed: Nov. 18, 2024

(65) Prior Publication Data

US 2025/0166556 A1 May 22, 2025

Related U.S. Application Data

(60) Provisional application No. 63/599,909, filed on Nov. 16, 2023.

(51) Int. Cl.
*G09G 3/32* (2016.01)

(52) U.S. Cl.
CPC ....... *G09G 3/32* (2013.01); *G09G 2300/0426* (2013.01); *G09G 2310/0267* (2013.01); *G09G 2370/10* (2013.01); *G09G 2370/12* (2013.01)

(58) Field of Classification Search
CPC ......................... G09G 2300/0426; G09G 3/32
See application file for complete search history.

(56) References Cited

U.S. PATENT DOCUMENTS

| | | | | |
|---|---|---|---|---|
| 2005/0140877 A1* | 6/2005 | Jeoung | G02F 1/133555 | 349/114 |
| 2010/0328344 A1* | 12/2010 | Mattila | G06F 3/04815 | 345/158 |
| 2013/0002310 A1* | 1/2013 | Liu | G09G 3/3677 | 327/109 |
| 2015/0109190 A1* | 4/2015 | Li | G09G 3/3426 | 345/82 |
| 2017/0309224 A1* | 10/2017 | Pappas | G09G 3/32 | |
| 2019/0334061 A1* | 10/2019 | Yoon | H10H 20/819 | |
| 2020/0312233 A1* | 10/2020 | Yen | G09G 3/3266 | |
| 2022/0149023 A1* | 5/2022 | Huang | H10D 89/611 | |
| 2025/0006122 A1* | 1/2025 | Zhang | G09G 3/3208 | |

* cited by examiner

*Primary Examiner* — Bipin Gyawali
(74) *Attorney, Agent, or Firm* — NKL Law; Allen Xue

(57) ABSTRACT

The provided is a LED display. The LED display includes: multiple pixels; and a constant current driver and a scan controller connected to the pixels with three sections. The cathodes of the LEDs are connected to each other and conducted to a ground via a pixel local transistor. Also, in the first section, the constant current driver is connected to the pixels through the second conducting layer, and the scan controller is connected to the pixels through the first conducting layer, in the second section, the constant current driver is connected to the pixels through the third conducting layer, and the scan controller is connected to the pixels through the first conducting layer, and in the second section, the constant current driver is connected to the pixels through the fourth conducting layers, and the scan controller is connected to the pixels through the first conducting layer.

9 Claims, 6 Drawing Sheets

MICRO LIGHT EMITTING DIODE DISPLAY

CROSS-REFERENCE TO RELATED APPLICATIONS

This application claims the benefit of priority under 35 U.S.C. § 119 to U.S. Provisional Application No. 63/599,909, filed on Nov. 16, 2023, and the entire contents of which are incorporated herein by reference.

BACKGROUND

1. Field of Technology

The present disclosure relates to a micro-Light emitting diode (micro-LED) display method and apparatus for a micro-LED display.

2. Description of Related Art

As an existing art for a conventional LED display, wire connections of active-matrix (AM) driving topology are relatively easy to be arranged. However, the AM driving has disadvantages such that under the AM driving, Digital-to-Analog Converter (DAC) limits the Gray Scale, and its response time is relatively slow. Also, the AM driving generally requires complicated thin-film-transistor (TFT) type pixel local circuits. Further, under the AM driving, due to the TFT's limited current supply, the efficiency of brightness is relatively low. Furthermore, under the AM driving, both the voltage_to_current converting and the current_to-_brightness of a micro-LED are not linear, and thus, colors of the display may not be uniform. Also, under the AM driving, the refresh rate of the display generally follows its frame rate, and its power consumption is relatively high.

Considering characteristics of mini/micro-LED display, passive-matrix (PM) driving topology has been developed. For example, using the pulse width modulation (PWM) mode, the response time of the display is faster than a display using the AM driving. Also, due to its constant current PWM mode, the PM driving may have a better brightness linearity and color uniformity. Also, the PM driving may consume less power than the AM driving. However, when a chip-on-glass (COG) display adopts the PM driving, its wire connections are relatively complicated, and its ground path may not be wide enough for a big return current.

SUMMARY

This summary is provided to introduce a selection of concepts in a simplified form that are further described below in the detailed description. It is not intended to identify key features or essential features of the claimed subject matter, nor is it intended to be used as an aid in determining the scope of the claimed subject matter.

According to an exemplary embodiment, an apparatus of LED display is provided, which resolves the technical problems of the conventional AM driving and the PM driving by achieving accurate current control. In particular, an exemplary embodiment utilizes a constant current source driver to drive LED anode nodes and resolves the return current metal density issue through using a pixel local transistor as a scan switch to conduct the common cathode to ground (GND).

In particular, the apparatus may include: multiple LEDs; a constant current driver configured to be connected to the anode of each of the LEDs; and a pixel local transistor configured to be connected to cathodes of the LEDs. In an exemplary embodiment, the cathodes of the LEDs are connected to each other and conducted to a ground via the pixel local transistor.

Further, according to an exemplary embodiment, the LED display further includes a scan controller configured to be connected to the gate of the pixel local transistor, such that the pixel local transistor functions as a scan switch. Also, the LED display further includes a video controller configured to be connected to the constant current driver and the scan controller and communicate with each other by a predetermined protocol. In an exemplary embodiment, the pixel local transistor can be an amorphous silicon (A-Si) TFT, an indium gallium zinc oxide (IGZO) TFT, a low-temperature polycrystalline silicon (LTPS) TFT and/or a silicon type micro integrated circuit (IC). Also, each of the LEDs can be a micro-LED implemented as a chip on glass (COG) display. Further, the predetermined protocol can include a lower layer protocol (LLP).

According to another exemplary embodiment, a LED display is provided. The LED display may include: multiple pixels; one or more constant current drivers configured to be connected to the pixels; and a scan controller configured to be connected to the pixels. The constant current driver and the scan controller with multiple outputs are configured to be connected to the pixels by a predetermined arrangement of three sections which comprises a first section, a second section and a third section. In the first section, the constant current driver is configured to be connected to the pixels through a second conducting layer, and the scan controller is configured to be connected to the pixels through a first conducting layer. In the second section, the constant current driver is configured to be connected to the pixels through a third conducting layer, and the scan controller is configured to be connected to the pixels through the first conducting layer. in the third section, the constant current driver is configured to be connected to the pixels through a fourth conducting layer, and the scan controller is configured to be connected to the pixels through the first conducting layer.

Also, in an exemplary embodiment, in the first section, the scan controller can be configured to be connected to the pixels through the first conducting layer and further through a first via. Also, in the second section, the scan controller can be configured to be connected to the pixels through the first conducting layer and further through the first via, the second conducting layer and a second via. In the second section, the scan controller can be configured to be connected to the pixels through the first conducting layer and further through the first via, the second conducting layer, the second via, the third conducting layer and a third via.

Further, in an exemplary embodiment, the LED display further includes a pixel local transistor configured to be provided between the first conducting layer and LEDs. The scan controller is configured to be connected to the gate of the pixel local transistor, such that the pixel local transistor functions as a scan switch. Also, the pixel local transistor can be a A-Si TFT, a IGZO TFT, a LTPS TFT and/or a silicon type micro IC. Each of the LEDs can be a micro-LED implemented as a chip on glass (COG) display. The LED display further can include a video controller configured to be connected to the constant current driver and the scan controller and communicate with each other by a predetermined protocol. The predetermined protocol can include an LED link protocol (LLP) and any LED controller system.

BRIEF DESCRIPTION OF THE DRAWINGS

Advantages of embodiments of the present invention will be apparent from the following detailed description of the exemplary embodiments thereof, which description should be considered in conjunction with the following drawings.

DETAILED DESCRIPTION OF EXEMPLARY EMBODIMENTS

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

According to an exemplary embodiment, and referring generally to the Figures, various exemplary implementations of a micro-LED display may be disclosed. In an exemplary embodiment, the technical problems of the conventional art are overcome by using a constant current source driver to drive LED anode nodes, which can achieve accurate current control. Also, an exemplary embodiment resolves the return current metal density issue through using a pixel local transistor as a scan switch to conduct the common cathode to ground (GND). Also, in an exemplary embodiment, PWM may be utilized to achieve high-resolution gray scale. Since the PWM may require a high frequency constant current control, a constant current source channel (CCSCH) may be used as a common cathode PWM control current source.

Figure 1A:
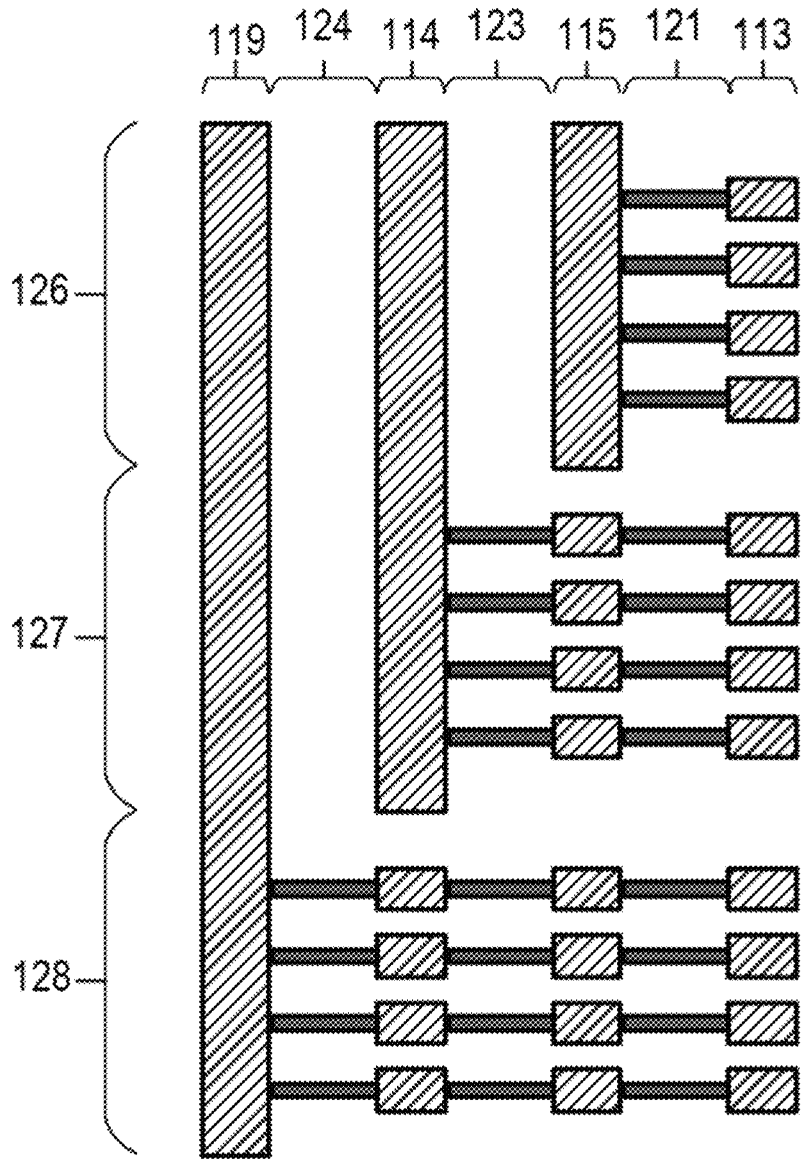
FIG. 1A is a diagram depicting an edge view (a side view assuming a landscape display orientation) of the arrangements of conducting layers in an exemplary embodiment.
Figure 1B:
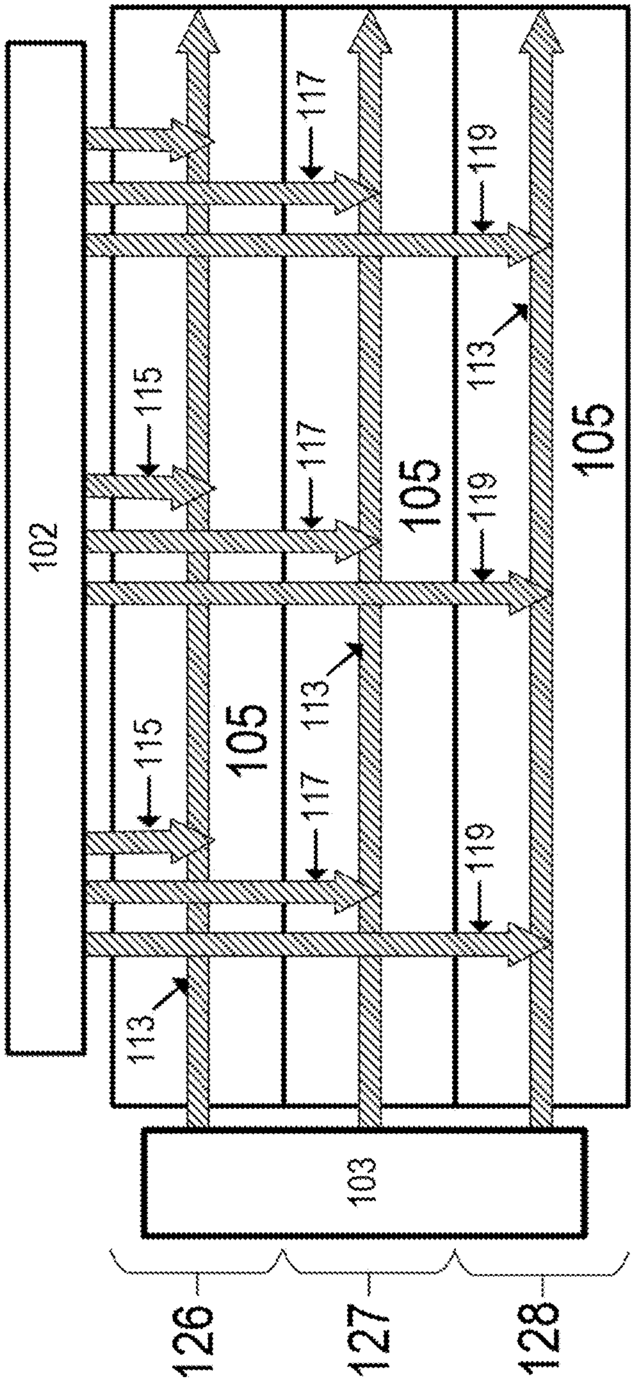
FIG. 1B is a diagram depicting a front view of the arrangements of wire connections in an exemplary embodiment.

Referring now to FIGS. 1A and 1B, FIGS. 1A and 1B describe arrangements of wire connections, which may be, as an example, divided into three sections (126, 127, and 128). In an exemplary embodiment, four conducting layers (113, 115, 117, and 119) and three via layers (121, 123, and 124) may be arranged. In an exemplary embodiment, the conducting layers (113, 115, 117, and 119) may include any type of metal or conducting layers. In the first section 126, the second conducting layer 115 may be a vertical wire connected to the first conducting layer 113, which is a horizontal wire through the first via 121 to LED 105. In the second section 127, the third conducting layer 117 may be used as a vertical wire and connected to the first conducting layer 113 through the second via 123, the second conducting layer 115 and the first via 121 to the LED 105. In third section, the fourth conducting layer 119 may be used as a vertical wire and connected to the first conducting layer 113 through the third via 124, the third conducting layer 117, the third via 124, the second conducting layer 115 and the first via 121 to the LED 105. According to an exemplary embodiment, in the horizon direction (scanning direction), the space of the first conducting layer 113 may be used for a pixel local transistor (scan switch transistor) and its connections. Also, in an exemplary embodiment, the pixel local transistor may be provided between the first conducting layer 113 and the LEDs. In FIG. 1B, the conducting layers (113, 115, 117, and 119) are described as arrows to indicate the driving and/or scanning directions.

Figure 1C:
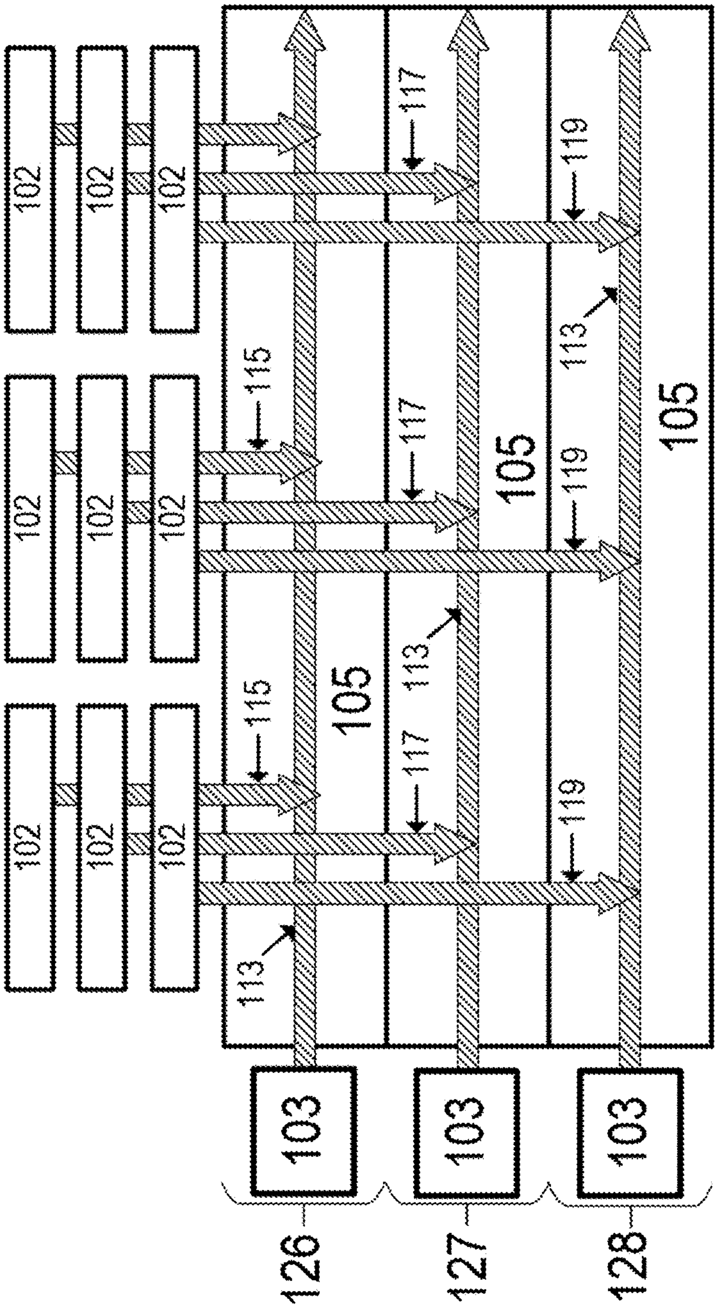
FIG. 1C is a diagram depicting a front view of the arrangements of wire connections where the scan controller is provided in each section, and the constant current driver is be arranged in each vertical pixel line in an exemplary embodiment.
Figure 1D:
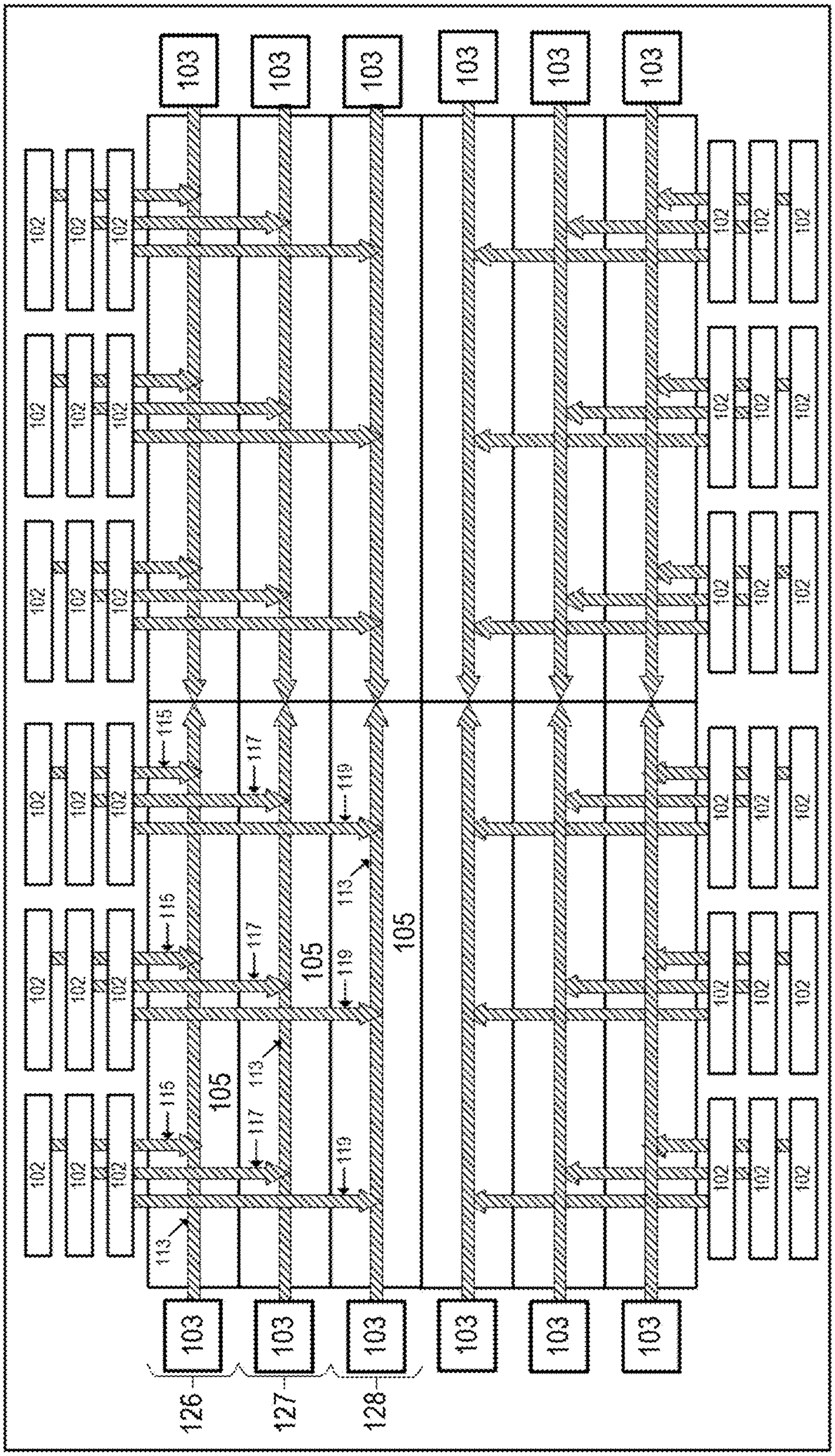
FIG. 1D is a diagram depicting that the arrangements of the vertical and horizontal wire connections are provided as a module having a predetermined number of pixels in an exemplary embodiment.

Referring now to FIGS. 1C and 1D, according to an exemplary embodiment, the scan controller 103 may be provided in each section, and the constant current driver 102 may be multiple constant drivers arranged for multiple vertical pixel lines. Also, in an exemplary embodiment, the above arrangements of the vertical and horizontal wire connections may be provided as a module having a predetermined number of pixels, and each module may be provided in each divided portion of the entire screen. For example, FIG. 1D shows a display having Modules I to IV.

Figure 2A:
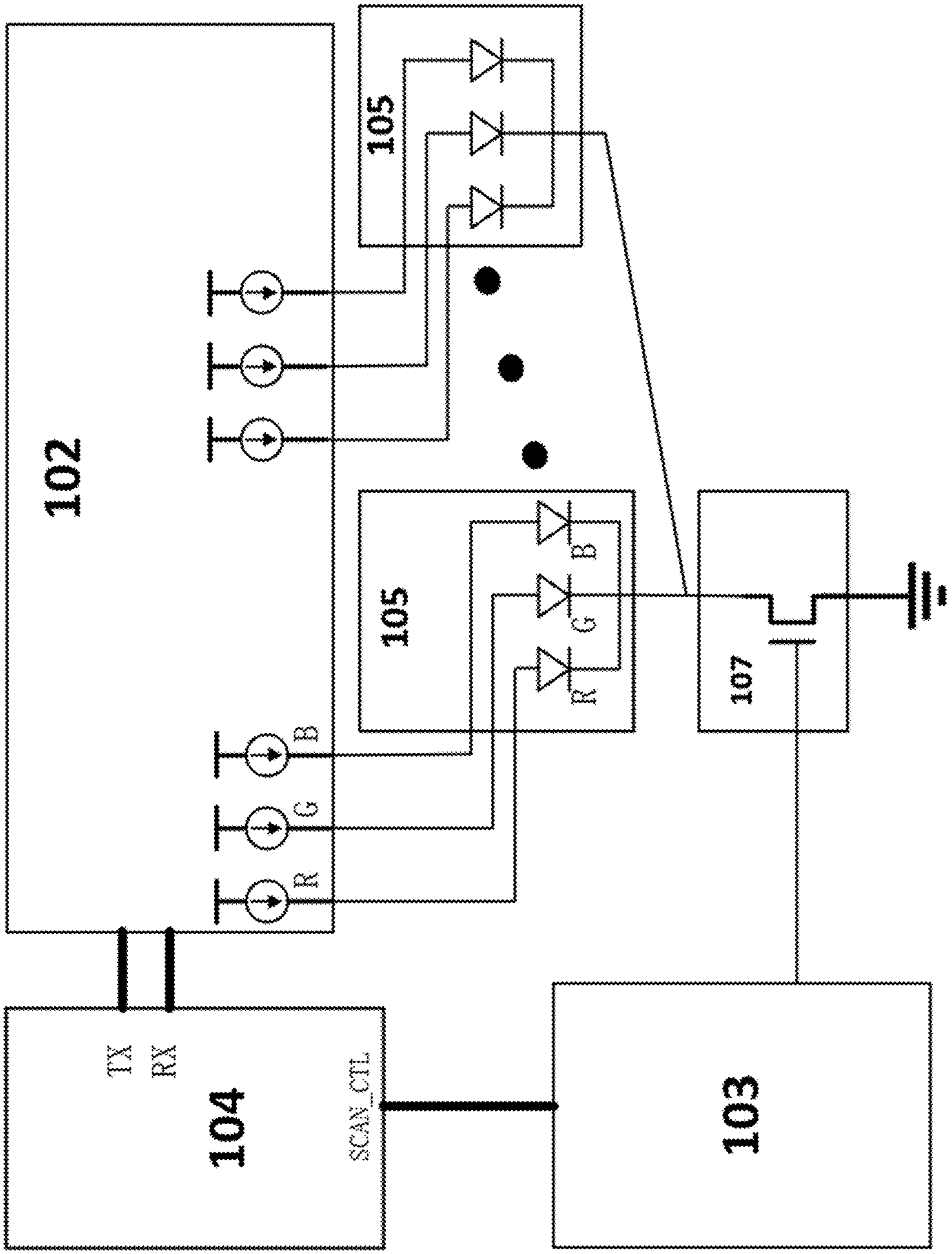
FIG. 2A is a diagram depicting the arrangements of the common cathode of LEDs and the pixel local transistor according to an exemplary embodiment.

Referring now to FIG. 2A, FIG. 2A describes that the cathode nodes of the LEDs 105 are connected to the pixel local transistor 107. According to an exemplary embodiment, the cathode nodes of the LEDs 105 may form common cathodes by being connected with each other and may further be connected to the pixel local transistor 107. The electric current flow through the pixel local transistor 107 may be the total current of the RGB of the LEDs 105, and the pixel local transistor 107 connected to LEDs 105 may be used as a scan switch. Thus, in an exemplary embodiment, the scan switch can be shared with adjacent pixels in the same scan line.

According to an exemplary embodiment, there may be a large conducting layer underneath the LEDs 105 and the pixel local transistors 107, that acts as a common GND. In an exemplary embodiment, the pixel local transistors 107 may conduct the current from the LEDs 105 into a common GND layer. Also, in an exemplary embodiment, the pixel local transistor 107 may be a TFT circuit, such as one or more transistors and/or a silicon type micro IC. According to an exemplary embodiment, while the relatively larger total pixel current may be drained to the large conducting layer GND through the individual pixel local transistor 107, a narrow signal wire may be enough to control the gate of pixel local transistors 107. Thus, in an exemplary embodiment, the use of wide metal to sustain the large return current for each scan switch can be avoided, and only narrow wire may be required for controlling the switch.

Referring still to FIG. 2A, FIG. 2A also describes that the pixel local transistor 107 is shared by neighbor pixels. According to an exemplary embodiment, the pixel local transistor 107 may be shared by neighboring LEDs 105, and thus the pixel local transistor 107 may be shared by more than one pixel, which is on the same scan line as shown in FIG. 2A. Thus, a wide scan metal for return current may not be required. According to an exemplary embodiment, in each scan cycle, the number of PWM pulses may be equivalent to the scan number, and thus the scan switch frequency can be lower than the frequency of CCSCH. For example, in a sixteen scans design, during each scan cycle, CCSCH needs to switch sixteen times, which requires the channel speed to be sixteen times faster than scan switch.

Figure 2B:
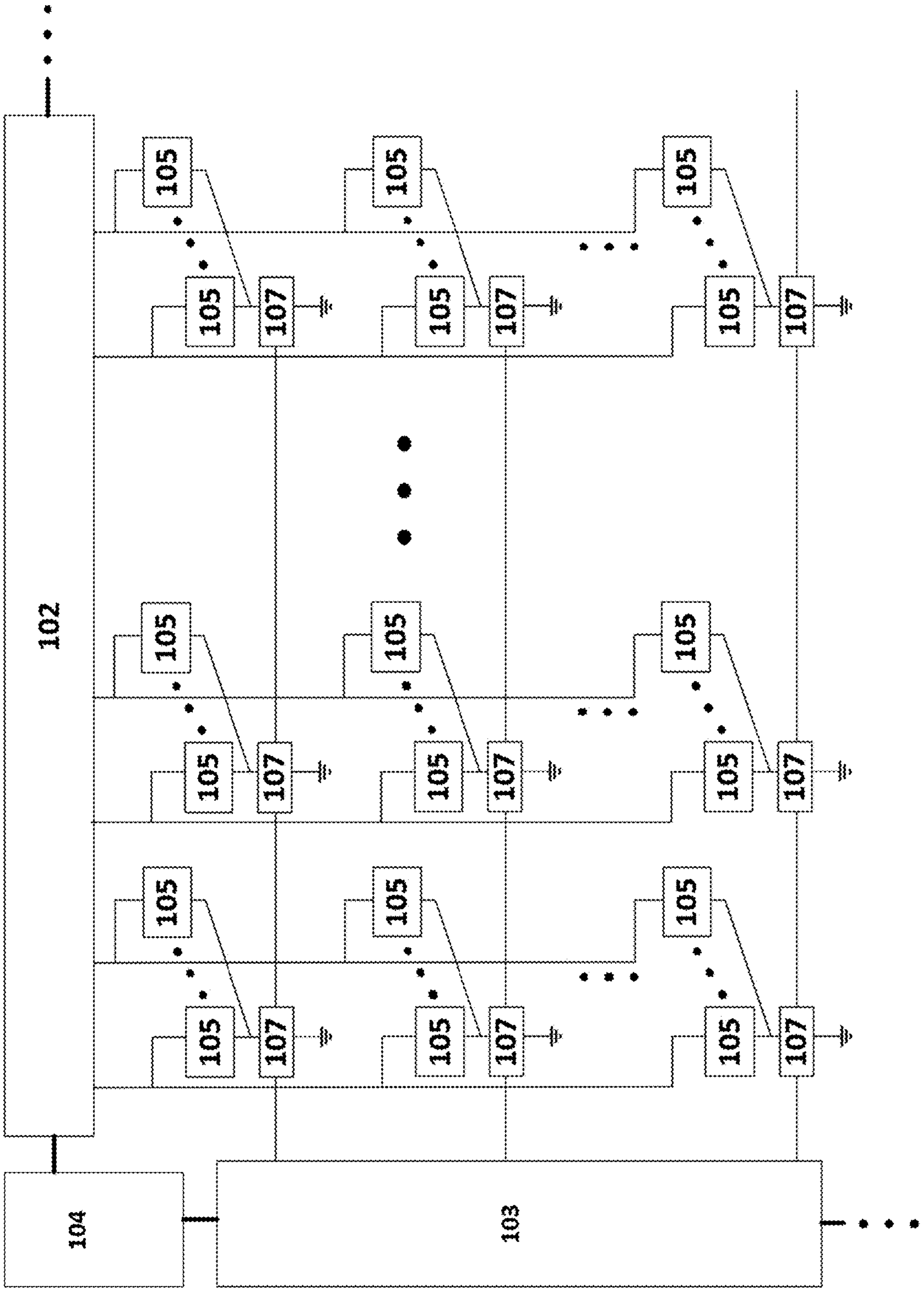
FIG. 2B is a diagram depicting that the arrangements of the common cathode of the pixel local transistor are provided as a module for a predetermined number of pixels according to an exemplary embodiment.

Referring now to FIG. 2B, according to an exemplary embodiment, the above arrangements of the common cathode of the pixel local transistor 107 may be provided as a module for a predetermined number of pixels, and each module may be provided in each divided portion of the entire screen. According to an exemplary embodiment, the constant current driver 102, for example, may drive 320×180 pixels, and thus a full high definition (Full HD) display may need eighteen constant current drivers 102 on top and another eighteen constant current drivers 102 on the bottom, but not limited thereto. Also, in an exemplary embodiment, the scan controller 103 may control 180 scan lines, and thus, a Full HD screen may require six (6) scan controllers on the left and another six (6) scan controllers on the right, but exemplary embodiments are not limited thereto.

According to an exemplary embodiment, the pixel local transistor 107 may be made by different type of TFT devices, such as amorphous silicon (A-Si) TFT, indium gallium zinc oxide (IGZO) TFT, low-temperature polycrystalline silicon (LTPS) TFT, a silicon type micro integrated circuit (IC), but not limited there to. In an exemplary embodiment, the video controller 104 may be the video and timing control device, but its functions are not limited there to. According to an exemplary embodiment, the video controller 104 may receive video input signals from video source, for example, through the high-definition multimedia interface (HDMI), which may include a clock signal (CLK), video data, enable and/or synchronize signals. Also, in an exemplary embodiment, the functioning of the video controller 104 may be defined as the followings. First, the output video data and control data are transferred to the constant current driver 102 with a predetermined protocol, for example, the lower layer protocol (LLP), and the feedback data is received from the constant current driver 102. Then, the video controller 104 outputs scan control signal to the scan controller 103. Referring still to FIG. 2B, only one video controller may be used for the entire screen. However, multiple video controllers may also be used in another exemplary embodiment.

According to an exemplary embodiment, the constant current driver 102 may include the following functions, but not limited thereto. First, the video and control data are received from the video controller 104, and the feedback data is transferred to the video controller 104. According to an exemplary embodiment, a frame buffer and/or a line buffer (not shown in the drawing) may buffer the video data, and handling of a video processing may include a gamma correction circuit and a calibration circuit. Also, in an exemplary embodiment, PWM pulses may be calculated and generated, and the constant current pulses may be provided to LEDs 105 based on the PWM pulses.

Also, in an exemplary embodiment, the scan controller 103 may include the following functions, but not limited thereto. First, the scan controller 103 receives and decodes the scan control signals from the video controller 104, and outputs scan_line voltage signals to the pixel local transistor 107. The scan line voltage signals is transferred to the next pixel local transistor 107.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

We claim:

1. A LED display, comprising:

a plurality of pixels;

at least one constant current driver configured to be connected to the pixels; and at least one scan controller configured to be connected to the pixels, wherein the constant current driver and the scan controller are connected to the pixels by a predetermined configuration comprising a first section, a second section and a third section, in the first section, the constant current driver is connected to the pixels through a second conducting layer, and the scan controller is connected to the pixels through a first conducting layer, in the second section, the constant current driver is connected to the pixels through a third conducting layer, and the scan controller is connected to the pixels through the first conducting layer, and in the third section, the constant current driver is connected to the pixels through a fourth conducting layer, and the scan controller is connected to the pixels through the first conducting layer.

2. The LED display of claim 1, wherein in the first section, the scan controller is connected to the pixels through the first conducting layer and further through a first via, in the second section, the scan controller is connected to the pixels through the first conducting layer and further through the first via, the second conducting layer and a second via, and in the third section, the scan controller is connected to the pixels through the first conducting layer and further through the first via, the second conducting layer, the second via, the third conducting layer and a third via.

3. The LED display of claim 1, wherein each of the pixels is a micro-LED implemented as a chip on glass (COG) display.

4. The LED display of claim 1, wherein the first conducting layer, the second conducting layer, the third conducting layer and the fourth conducting layer are conductive tracks selected from wires, inkjet printed conductive tapes, or metal strips.

5. The LED display of claim 1, further comprising at least one pixel local transistor disposed between the first conducting layer and LEDs.

6. The LED display of claim 5, wherein the scan controller is connected to at least one gate of the pixel local transistor, such that the pixel local transistor functions as a scan switch during operation.

7. The LED display of claim 5, the pixel local transistor is at least one of an amorphous silicon (A-Si) TFT, an indium gallium zinc oxide (IGZO) TFT, a low-temperature polycrystalline silicon (LTPS) TFT and a silicon type micro integrated circuit (IC).

8. The LED display of claim 1, further comprising at least one video controller configured to be connected to the constant current driver and the scan controller and communicate with each other by a predetermined protocol.

9. The LED display of claim 8, wherein the predetermined protocol includes a lower layer protocol (LLP).

* * * * *